United States Patent
Park et al.

(10) Patent No.: US 10,889,707 B2
(45) Date of Patent: Jan. 12, 2021

(54) GLASS FIBER COMPOSITE MATERIAL COMPOSITION HAVING IMPROVED IMPACT STRENGTH

(71) Applicant: LOTTE CHEMICAL CORPORATION, Seoul (KR)

(72) Inventors: Ju Hee Park, Incheon (KR); Byung Kak Jang, Daejeon (KR); Seung Ju Lee, Seoul (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 0 days.

(21) Appl. No.: 16/331,907

(22) PCT Filed: Sep. 18, 2017

(86) PCT No.: PCT/KR2017/010212
§ 371 (c)(1),
(2) Date: Mar. 8, 2019

(87) PCT Pub. No.: WO2018/052265
PCT Pub. Date: Mar. 22, 2018

(65) Prior Publication Data
US 2019/0203024 A1    Jul. 4, 2019

(30) Foreign Application Priority Data
Sep. 19, 2016  (KR) .................... 10-2016-0119359

(51) Int. Cl.
| | | |
|---|---|---|
| *C08L 23/12* | (2006.01) | |
| *C08J 5/08* | (2006.01) | |
| *C08K 7/14* | (2006.01) | |
| *C08L 23/14* | (2006.01) | |
| *C08L 23/08* | (2006.01) | |
| *C08K 9/06* | (2006.01) | |

(52) U.S. Cl.
CPC ............. *C08L 23/12* (2013.01); *C08J 5/08* (2013.01); *C08K 7/14* (2013.01); *C08K 9/06* (2013.01); *C08L 23/0807* (2013.01); *C08L 23/147* (2013.01); *C08J 2323/12* (2013.01); *C08J 2423/30* (2013.01); *C08L 2205/025* (2013.01); *C08L 2205/03* (2013.01)

(58) Field of Classification Search
CPC .... C08L 23/12; C08L 23/0807; C08L 23/147; C08J 5/08; C08K 7/14; C08K 9/06
USPC ....................................................... 523/206
See application file for complete search history.

(56) References Cited

U.S. PATENT DOCUMENTS

| | | | |
|---|---|---|---|
| 4,146,529 A | | 3/1979 | Yamamoto et al. |
| 4,480,057 A * | | 10/1984 | Sano .............. C08K 9/08 523/206 |
| 5,036,127 A * | | 7/1991 | Ueno .............. C08K 3/22 524/423 |
| 5,324,755 A * | | 6/1994 | Kilius ............ C08K 9/06 523/214 |
| 6,284,831 B1 * | | 9/2001 | Shimpuku ....... C08J 5/10 524/492 |
| 2010/0317791 A1 * | | 12/2010 | Stockreiter ..... C08L 23/10 524/528 |

FOREIGN PATENT DOCUMENTS

| | | |
|---|---|---|
| CN | 101735398 A | 6/2010 |
| CN | 103146075 A | 6/2013 |
| CN | 104877272 A | 9/2015 |
| CN | 105102529 A | 11/2015 |
| JP | 2014-208807 A | 11/2014 |
| KR | 90-000936 B1 | 2/1990 |
| KR | 1998-024289 A | 7/1998 |
| KR | 10-0666769 | 1/2007 |
| KR | 10-2008-0048473 A | 6/2008 |
| KR | 10-0854322 B1 | 8/2008 |

OTHER PUBLICATIONS

Supplementary European Search Report for corresponding European Application No. EP 17 85 1139, Supplementary European Search Report dated Feb. 10, 2020 (4 pgs.).
China Office Action in corresponding China Application No. 201780056915.6, China Office action dated Jul. 31, 2020 (7 pgs.).

* cited by examiner

*Primary Examiner* — Hannah J Pak
(74) *Attorney, Agent, or Firm* — Lewis Roca Rothgerber Christie LLP

(57) ABSTRACT

Disclosed is a glass fiber composite material composition having further improved compatibility between glass fibers and polypropylene and thus maximized interfacial adhesion between the resin and the glass fibers in a glass fiber composite material. The present invention provides a glass fiber composite material composition comprising: (A) 60-93% by weight of polypropylene; (B) 1-30% by weight of glass fiber sized with a silane-based compound; and (C) 1-10% by weight of a polypropylene resin modified with maleic anhydride and a methacryloxysilane-based compound.

5 Claims, No Drawings

GLASS FIBER COMPOSITE MATERIAL COMPOSITION HAVING IMPROVED IMPACT STRENGTH

CROSS-REFERENCE TO RELATED APPLICATIONS

This application is a National Phase Patent Application and claims priority to and the benefit of International Application Number PCT/KR2017/010212, filed on Sep. 18, 2017, which claims priority to and the benefit of Korean Patent Application No. 10-2016-0119359, filed on Sep. 19, 2016, in the Korean Intellectual Property Office, the disclosure of each of which is incorporated herein in its entirety by reference.

TECHNICAL FIELD

The present invention relates to a glass fiber composite material composition and, more specifically, to a glass fiber composite material composition having improved impact strength.

BACKGROUND ART

In general, since thermoplastic resins have low dimensional stability, low heat resistance, and low rigidity, they are unsuitable for use as materials for parts requiring high strength and precision. In order to compensate such defect, a method of using an inorganic filler such as glass fibers as a reinforcing material is generally known.

In the production of such thermoplastic composite materials, it is very important to increase the interfacial bonding force between the reinforcing material and the resin. When the interfacial bonding force between the resin and the reinforcing material is lowered, a stress applied to the thermoplastic composite material acts on the interface between the resin and the reinforcing material to cause a fracture around the interface, and thus the desired effect of increasing the rigidity cannot be achieved.

Maleic anhydride- or silane compound-grafted polyolefins were applied in the production of conventional glass fiber reinforced composite materials in an attempt to improve the compatibility between glass fibers and polypropylene, but there was a limit to the improvement in the sufficient interfacial adhesion.

PRIOR PATENT DOCUMENTS

Chinese Unexamined Patent Publication No. 101735398 (16 Jun. 2010)
Korean Unexamined Patent Publication No. 2008-0048473 (2 Jun. 2008)

DISCLOSURE OF THE INVENTION

Technical Problem

Therefore, the present invention has been made to solve the above problem, and provides a glass fiber composite material composition having further improved compatibility between glass fibers and polypropylene and thus maximized interfacial adhesion between the resin and the glass fibers in a glass fiber composite material.

Technical Solution

In order to solve the above problem, the present invention provides a glass fiber composite material composition comprising: (A) 60-93% by weight of polypropylene; (B) 1-30% by weight of glass fiber sized with a silane-based compound; and (C) 1-10% by weight of a polypropylene resin modified with maleic anhydride and a methacryloxysilane-based compound.

The glass fiber composite material composition in which the glass fiber is sized with 3-methacryloxypropyltrimethoxysilane or 3-methacryloxypropyltriethoxysilane is also provided.

The glass fiber composite material composition in which the methacryloxysilane-based compound is 3-methacryloxypropyltrimethoxysilane or 3-methacryloxypropyltriethoxysilane is also provided.

The glass fiber composite material composition in which the modified polypropylene resin has the maleic anhydride content of 0.5-3 wt % and the methacryloxysilane-based compound content of 0.5-5 wt %, on the basis of 100 wt % of the modified polypropylene resin is also provided.

The glass fiber composite material composition in which the modified polypropylene resin is obtained by co-grafting the maleic anhydride and the methacryloxysilane-based compound is also provided.

The glass fiber composite material composition further comprising (D) 5-20 parts by weight of an olefin block copolymer, on the basis of a total of 100 parts by weight of the components (A) to (C) is also provided.

The glass fiber composite material composition in which the olefin block copolymer is one or more selected from the group consisting of a propylene/ethylene block copolymer, an ethylene/octene block copolymer, an ethylene/butene block copolymer, and an ethylene/hexene block copolymer is also provided.

Advantageous Effects

According to the present invention, by applying: a modified polyolefin obtained by co-grafting maleic anhydride and a silane group; and glass fibers of which the surfaces are treated with silane sizing, a glass fiber composite material composition having further improved interfacial adhesion between the resin and the glass fibers and thus extraordinarily improved impact strength compared to conventional glass fiber composite material compositions can be provided.

MODE FOR CARRYING OUT THE INVENTION

Hereinafter, preferred examples of the present invention are described in detail. When it is determined that describing relevant known techniques in detail during the course of describing the present invention can obscure the essence of the present invention, such detailed description will be excluded. Throughout the specification, when a particular part is said to "include" an element, the presence of other elements is not precluded and other elements may be further included, unless explicitly indicated otherwise.

A glass fiber composite material composition according to the present invention includes (A) 60-93 wt % of polypropylene; (B) 1-30 wt % of glass fiber sized with a silane-based compound; and (C) 1-10 wt % of a polypropylene resin modified with maleic anhydride and a methacryloxysilane-based compound, and preferably, may further include (D) 5-20 parts by weight of an olefin block copolymer, on the basis of a total of 100 parts by weight of the components (A) to (C).

Hereinafter, each component of the glass fiber composite material composition according to the present invention is described in more detail.

(A) Polypropylene Resin

The polypropylene resin used in the present invention is not particularly limited as long as it is a conventional polypropylene resin used for a material for parts requiring high strength and precision, and preferably, may be homo polypropylene, a random copolymer obtained by polymerizing one or more comonomers selected from the group consisting of propylene, ethylene, butylene, and octene, etc.

When the polypropylene resin is used, there is an advantage in that the rigidity and impact resistance are excellent.

In the present invention, the polypropylene resin is contained in an amount of 60-93 wt %, preferably, 80-90 wt %. The polypropylene resin within the range may enhance the dispersibility and impregnation property of the glass fiber, in combination with the contents of other components according to the present invention.

(B) Glass Fiber Sized with the Silane-Based Compound

The glass fiber used in the present invention is a reinforcing material, the surface of which is treated with a coupling agent.

In addition, for the glass fiber used in the present invention, chopped glass fiber ranging in diameter from 5 to 50 μm and in length from about 2 to about 8 mm is preferable and the content thereof is 1 to 30 wt % and may be 5 to 15 wt % in order to maximize the dispersibility and the impregnation property of the glass fiber in combination with the contents of other components.

In the present invention, the glass fiber coupling agent is generally treated during fiber production or post-processing. In the present invention, as an acrylic silane compound, preferably 3-methacryloxypropyltrimethoxysilane or 3-methacryloxypropyltriethoxysilane, most preferably, 3-methacryloxypropyltriethoxysilane may be used.

(C) Polypropylene Resin Modified with Maleic Anhydride and Methacryloxysilane-Based Compound In the present invention, the modified polypropylene resin is used for improvement in the compatibility between the base resin and the glass fiber. In the present invention, a compatibilizer, obtained by co-grafting maleic anhydride and a methacryloxysilane-based compound, is used.

Here, when 3-methacryloxypropyltrimethoxysilane or 3-methacryloxypropyltriethoxysilane is used as the methacryloxysilane-based compound, glass fiber sized with the same compound is used and thus the dispersibility and impregnation property of the glass fiber may be maximized.

The polypropylene resin modified with maleic anhydride and the methacryloxysilane-based compound may be prepared using polypropylene, maleic anhydride, the methacryloxysilane-based compound, and a peroxide initiator. For example, the polypropylene resin modified with maleic anhydride and the methacryloxysilane-based compound may be prepared by putting polypropylene, maleic anhydride, and the peroxide initiator into a main feeder with the use of a biaxial extruder and side-feeding the methacryloxysilane-based compound by means of a liquid feeder.

It is preferable that the content of the maleic anhydride among the components constituting the modified polypropylene resin is 0.5-3 wt %, the methacryloxysilane-based compound content is 0.5-5 wt %, and the peroxide initiator content may be 0.01-0.1 wt %. Here, the component, excluding the maleic anhydride, the methacryloxysilane-based compound, and the peroxide initiator, is the polypropylene resin, and the total weight of the components constitutes 100 wt %. When the maleic anhydride content is less than 0.5 wt % or when the methacryloxysilane-based compound content is less than 0.5 wt %, the polarity is low and thus, the dispersibility of the glass fiber may be lowered. When the maleic anhydride content is more than 3 wt % or when the methacryloxysilane-based compound content is more than 5 wt %, the polarity is too high and thus, the compatibility with the hydrophobic polypropylene resin may be lowered.

The peroxide initiator is a compound which generates radicals in the polypropylene resin and allows the graft reaction of the maleic anhydride, etc. onto the polypropylene, and may be, without limitation, any initiator which can be commonly used in the polymerization or copolymerization reaction. For example, the peroxide initiator may be hydrogen peroxide, ketone peroxide, methyl ethyl ketone peroxide, cyclohexanone peroxide, methyl isobutyl ketone peroxide, diacyl peroxide, lauroyl peroxide, isobutyryl peroxide, acetyl peroxide, 2,4-dichlorobenzoyl peroxide, succinic acid peroxide, decanoyl peroxide, diisononanoyl peroxide, perester, etc., and preferably, 2,5-dimethyl-2,5-di(t-butylperoxy)hexane (DTBPH) or dicumyl peroxide.

Here, when the peroxide initiator content is less than 0.01 wt %, sufficient graft reaction between the polypropylene resin and the maleic anhydride, etc. may be difficult to be achieved. In terms of desirable cost securement relative to effects, it is preferable to maintain the content less than 0.1 wt %.

In the present invention, the modified polypropylene resin is contained in an amount of 1-10 wt %, preferably, 2-8 wt %. The modified polypropylene resin within the range may enhance the dispersibility and impregnation property of the glass fiber, in combination with the contents of other components according to the present invention.

(D) Olefin Block Copolymer

In the present invention, in order to increase the compatibility between the base resin and the glass fiber, while maintaining the improved dispersibility of the glass fiber, thereby further improving the entire mechanical properties such as impact strength, etc. of the finally produced glass fiber composite material composition, the olefin block copolymer may be added.

Preferably, the olefin block copolymer may be a propylene/ethylene block copolymer, an ethylene/octene block copolymer, an ethylene/butene block copolymer, or an ethylene/hexene block copolymer. Herein, in order to maximize the improvement in the compatibility, it is preferable that the density of the olefin block copolymer is 0.86-0.90 g/cm3 and the melt flow rate (MFR, 230° C., 2.16 kg loading) of the olefin block copolymer is 1-15 g/10 min.

In the present invention, the olefin block copolymer may be added in the content of 5-20 parts by weight, preferably 7-15 parts by weight, on the basis of a total of 100 parts by weight of the components (A) to (C).

The glass fiber composite material composition according to the present invention may be prepared by known methods. For example, the glass fiber composite material composition according to the present invention may be prepared by mixing (A) 60-93 wt % of the polypropylene; (B) 1-30 wt % of the glass fiber sized with the silane-based compound; (C) 1-10 wt % of the polypropylene resin modified with the maleic anhydride and the methacryloxysilane-based compound; and (D) 5-20 parts by weight of the olefin block copolymer, on the basis of a total of 100 parts by weight of the components (A) to (C), at the same time, and then melt-extruding the mixture in a pellet form in an extruder. Herein, the melt-extrusion may be carried out by means of a monoaxial extruder, a biaxial extruder, or a kneader, for a retention time of 5-90 seconds under the conditions of a screw rotation speed of 50-500 rpm and an extrusion temperature of 150-220° C.

Needless to say, the glass fiber composite material composition according to the present invention may further include various functional additives in addition to the above-mentioned components, depending on the intention of an operator, a use of a final product, etc. Examples of functional additives include antioxidants, UV stabilizers, flame retardants, colorants, plasticizers, nucleating agents, thermal stabilizers, slip agents, etc. and the amounts of the additives to be used may be adjusted to the optimum range in consideration of a total production amount, a manufacturing process, etc. within the each range known to be usable for producing the glass fiber composite material. The additive may be further added in the step of mixing the above-mentioned components or may be added by kneading in a separate addition step.

Hereinafter, the present invention is described in more detail with reference to examples and comparative examples.

EXAMPLE 1

The glass fiber composite material composition was prepared by mixing (A) 85 wt % of the polypropylene resin (JM-370, Lotte Chemical Corp.), (B) 10 wt % of the glass fiber (chopped glass fiber ranging in diameter from 10 to 15 μm and in length from 3 to 4 mm, of which the surface was sized with 3-methacryloxypropyltriethoxysilane by immersion), and (C) 5 wt % of the modified polypropylene resin (95.5 wt % of homo polypropylene, 1 wt % of maleic anhydride, 1 wt % of 3-methacryloxypropyltriethoxysilane, and 2.5 wt % of DTBPH) with Henschel mixer for three minutes and extruding the mixture by a biaxial extruder (screw diameter 30 mm, L/D 40) under the extrusion condition of a screw rotation speed of 400 rpm at 160-200° C.

EXAMPLE 2

The glass fiber composite material composition was prepared in the same way as Example 1, except that the composition of the modified polypropylene resin in Example 1 was changed to 93 wt % of homo polypropylene, 1 wt % of maleic anhydride, 1 wt % of 3-methacryloxylpropyltriethoxysilane, and 5 wt % of DTBPH.

EXAMPLE 3

The glass fiber composite material composition was prepared in the same way as Example 1, except that the composition of the modified polypropylene resin in Example 1 was changed to 91 wt % of homo polypropylene, 1 wt % of maleic anhydride, 3 wt % of 3-methacryloxylpropyltriethoxysilane, and 5 wt % of DTBPH.

Comparative Example 1

The glass fiber composite material composition was prepared in the same way as Example 1, except that the glass fiber of which the surface was not sized was used in Example 1.

EXAMPLE 4

The glass fiber composite material composition was prepared in the same way as Example 1, except that 10 parts by weight of a propylene/ethylene block copolymer (the ethylene content of 8 wt %) was mixed together on the basis of a total of 100 parts of weights of the components (A) to (C) in Example 1.

EXAMPLE 5

The glass fiber composite material composition was prepared in the same way as Example 2, except that 10 parts by weight of a propylene/ethylene block copolymer (the ethylene content of 8 wt %) was mixed together on the basis of a total of 100 parts of weights of the components (A) to (C) in Example 2.

EXAMPLE 6

The glass fiber composite material composition was prepared in the same way as Example 3, except that 10 parts by weight of a propylene/ethylene block copolymer (the ethylene content of 8 wt %) was mixed together on the basis of a total of 100 parts of weights of the components (A) to (C) in Example 3.

Comparative Example 2

The glass fiber composite material composition was prepared in the same way as Example 4, except that the glass fiber of which the surface was not sized was used in Example 4.

Experimental Example

The tensile strength, impact strength, flexural modulus, and flexural strength of the glass fiber composite material compositions prepared according to Examples and Comparative examples were measured and the results thereof are shown in Table 1 below.

Measurement Methods (1) Tensile strength: measured according to ASTM evaluation method D638.
(2) Impact strength: measured according to ASTM evaluation method D256.
(3) Flexural modulus and flexural strength: measured according to ASTM evaluation method D790.

TABLE 1

| Item | Tensile strength (kgf/cm$^2$) | Impact strength (23° C.) kg·cm/cm | Impact strength (−30° C.) kg·cm/cm | Flexural modulus (kgf/cm$^2$) | Flexural strength (kgf/cm$^2$) | Density (g/cm$^3$) |
|---|---|---|---|---|---|---|
| Exp. 1 | 397 | 4.0 | 2.8 | 20300 | 486 | 0.9607 |

TABLE 1-continued

| Item | Tensile strength (kgf/cm²) | Impact strength (23° C.) kg · cm/cm | Impact strength (−30° C.) kg · cm/cm | Flexural modulus (kgf/cm²) | Flexural strength (kgf/cm²) | Density (g/cm³) |
|---|---|---|---|---|---|---|
| Exp. 2 | 405 | 4.1 | 2.8 | 21200 | 497 | 0.9656 |
| Exp. 3 | 413 | 4.4 | 3.4 | 21000 | 493 | 0.9634 |
| Exp. 4 | 431 | 6.3 | 2.9 | 23800 | 490 | 0.9621 |
| Exp. 5 | 440 | 6.9 | 3.8 | 23500 | 520 | 0.9684 |
| Exp. 6 | 448 | 7.5 | 5.2 | 27000 | 585 | 0.9689 |
| Comp. Exp. 1 | 355 | 3.4 | 2.5 | 19800 | 425 | 0.9588 |
| Comp. Exp. 2 | 373 | 3.5 | 2.7 | 20100 | 430 | 0.9631 |

Referring to Table 1, the glass fiber composite material compositions prepared by optimally combining the polypropylene, the glass fiber sized with the silane-based compound, and the polypropylene resin modified with maleic anhydride and the methacryloxysilane-based compound according to the present invention (Examples 1 to 3) were found to have excellent mechanical properties including impact strength and particularly, the glass fiber composite material compositions prepared by further adding the optimum content of the olefin block copolymer (Examples 4 to 6) were found to have a remarkable effect of improving physical properties.

In comparison, the glass fiber composite material compositions prepared by using the optimum content of the polypropylene resin modified with maleic anhydride and the methacryloxysilane-based compound, but applying the general glass fiber not sized with the silane-based compound were found to have relatively remarkably lowered mechanical properties such as impact strength, etc.

Hereinabove, preferred examples of the present invention have been described in detail. Description of the present invention is intended to be merely exemplary, and it will be understood by those skilled in the art to which the present invention belongs that the present invention can be easily modified into other specific forms without changing the technical concepts or essential features thereof.

Thus, the scope of the present invention is defined by the scope of the claims below, rather than by the detailed description given above. All modifications or modified forms derived from the meaning, scope, and equivalent concepts of the claims are to be construed as being within the scope of the present invention.

The invention claimed is:

1. A glass fiber composite material composition comprising: (A) 60-93% by weight of polypropylene; (B) 1-30% by weight of glass fiber sized with a methacryloxysilane-based compound; and (C) 1-10% by weight of a polypropylene resin modified with maleic anhydride and a methacryloxysilane-based compound, wherein the modified polypropylene resin has the maleic anhydride content of 0.5-3 wt % and the methacryloxysilane-based compound content of 0.5-5 wt %, on the basis of 100 wt % of the modified polypropylene resin, and the methacryloxysilane-based compounds are 3-methacryloxypropyltrimethoxysilane or 3-methacryloxypropyltriethoxysilane.

2. The glass fiber composite material composition of claim 1, wherein the modified polypropylene resin is obtained by co-grafting the maleic anhydride and the methacryloxysilane-based compound.

3. The glass fiber composite material composition of claim 1, wherein the composition further comprises (D) 5-20 parts by weight of an olefin block copolymer, on the basis of a total of 100 parts by weight of the components (A) to (C).

4. The glass fiber composite material composition of claim 3, wherein the olefin block copolymer is one or more selected from the group consisting of a propylene/ethylene block copolymer, an ethylene/octene block copolymer, an ethylene/butene block copolymer, and an ethylene/hexene block copolymer.

5. The glass fiber composite material composition of claim 1, wherein one of the methacryloxysilane-based compounds is 3-methacryloxypropyltriethoxysilane.

* * * * *